United States Patent [19]
Langlois

[11] 3,777,340
[45] Dec. 11, 1973

[54] DEVICE FOR PRE-BALANCING UNBALANCED MASSES ON CRANKSHAFTS
[75] Inventor: Christian Langlois, Billancourt, France
[73] Assignee: Regie Nationale Des Usines, Renault, Billancourt, France
[22] Filed: June 15, 1971
[21] Appl. No.: 153,285

[52] U.S. Cl. .................................. 29/1 D, 74/603
[51] Int. Cl. .............................................. B23p 13/00
[58] Field of Search ........................ 29/1 D; 74/603

[56] References Cited
UNITED STATES PATENTS
| | | | |
|---|---|---|---|
| 3,673,651 | 7/1972 | Stewart | 29/1 D |
| 2,014,838 | 9/1935 | Edwards | 74/603 X |
| 2,610,524 | 9/1952 | Maust | 74/603 |
| 2,568,876 | 9/1951 | Witzky | 74/603 |

Primary Examiner—Andrew R. Juhasz
Assistant Examiner—Leon Gilden
Attorney—Stevens, Davis, Miller & Mosher

[57] ABSTRACT

A device for quick attachment to a crankshaft for balancing it. It comtemplates pre-balancing the unbalance masses of crankshafts of piston engines in order to subsequently perform the dynamic balancing thereof with due consideration for the wants-of-balance generated by the connecting-rod masses. These wants-of-balance are simulated by positioning on the crankshaft a single pre-balancing member having two ballasts disposed in parallel planes perpendicular to the axis of rotation of the crankshaft. This simulation member also has two resilient clamping members adapted to engage two crankpins of the crankshaft to be balanced, an angular positioning fork engaging a third crankpin, and longitudinal positioning faces between the webs of one of said crankpins.

3 Claims, 5 Drawing Figures

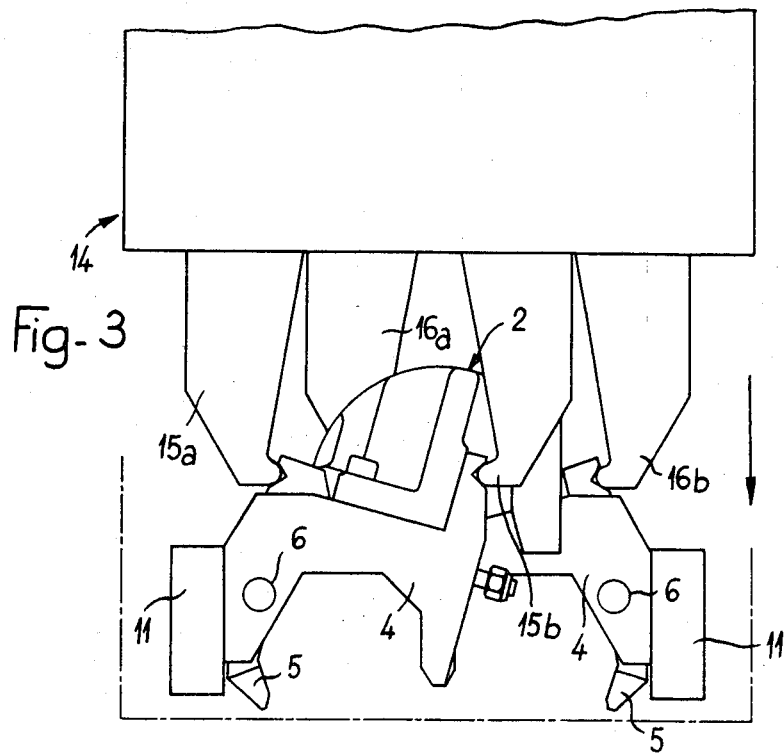
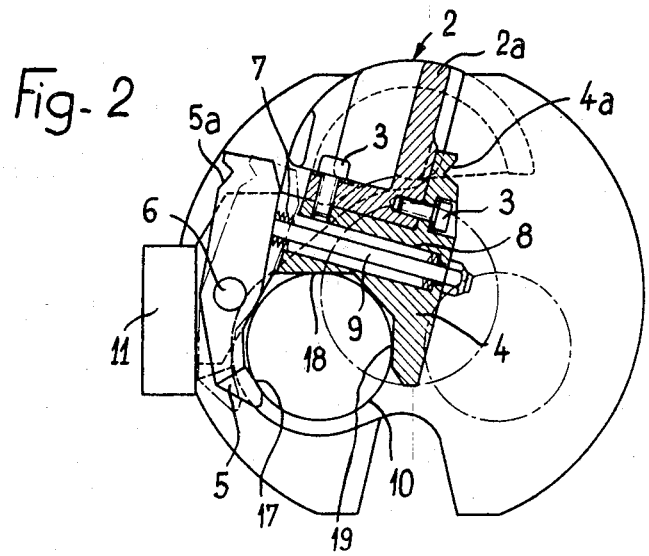

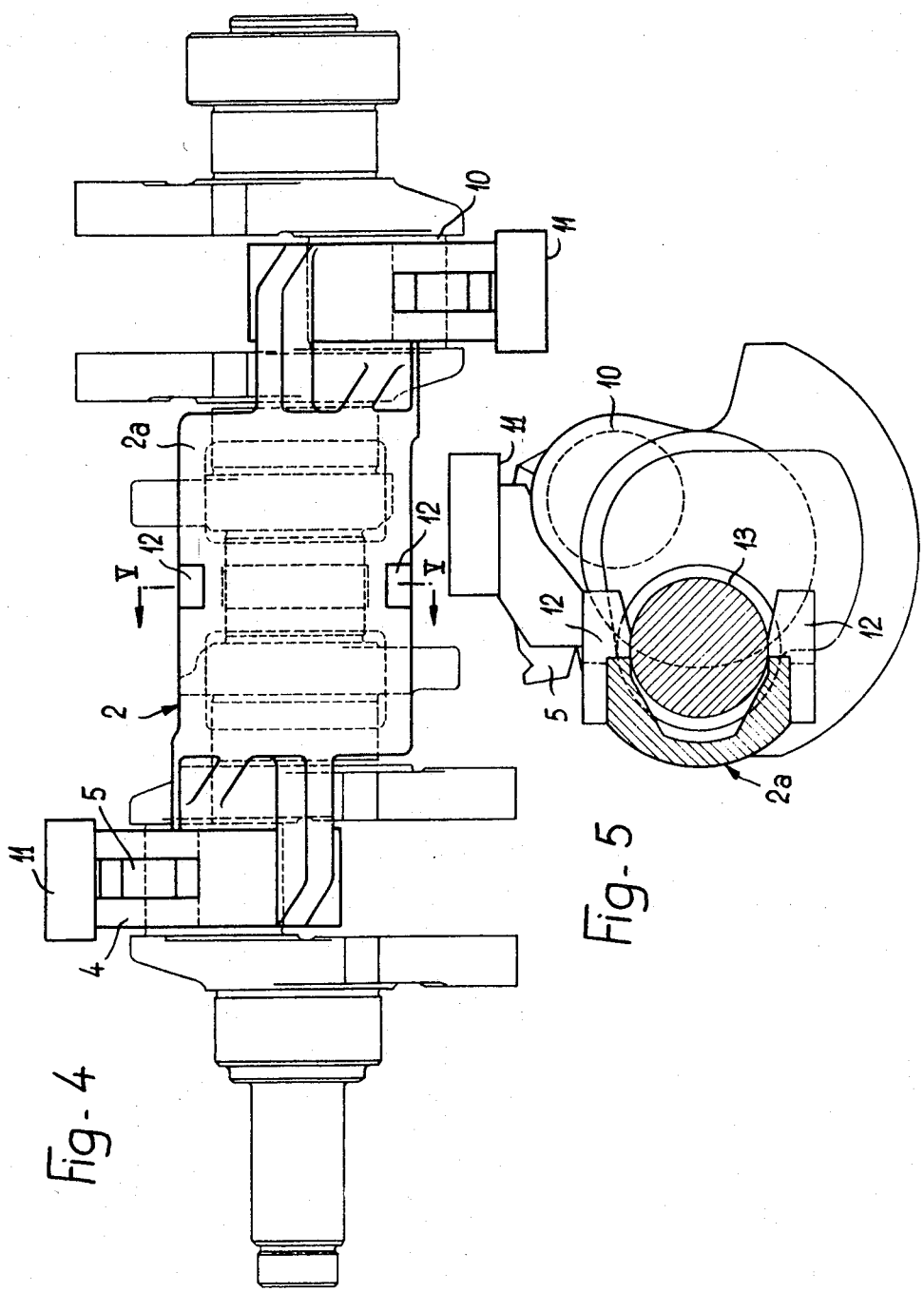

DEVICE FOR PRE-BALANCING UNBALANCED MASSES ON CRANKSHAFTS

The present invention relates to a means for automatically measuring the want-of balance of, and therefore correcting in series and also automatically, the crankshafts of piston engines when these crankshafts, taken alone, must have a want-of-balance equal and opposite to the dynamic action of the connecting-rods which will later be connected to the crankshaft.

This is a common problem particularly with mass produced six- or eight-cylinder V-engines.

These crankshafts may be individually balanced when manufactured or in small groups, by fitting to each crankpin, before the balancing operation, a collar which more or less simulates the action exerted by an actual cranksahft and connecting-rod assembly.

In mass production considerable time and money are lost when fitting prior art inertia weights or collars before the actual balancing operation, and subsequently removing them at the end of this operation. It is also expensive to keep the prior art weights in proper condition, so as to avoid possible damages to the crankshafts. On the other hand, performing these operations (fitting and removing inertia weights or masses, and also handling them) under fully automatic conditions is an abnormally complicated problem which has found no practical and economical solution in the conventional prior art.

In the case of crankshafts having a natural want-of-balance as in the case of the afore-mentioned V-8 engine crankshafts, it may be assumed that the problem consists in giving to the crankshaft a system of known unbalance masses, equal and opposite to that of the connecting-rod system ; basically, and theoretically, it should be possible to measure on a known balancing machine the degree of wants-of-balance needed by the crankshaft, and to calculate automatically the correction unbalance masses to be created so that the modified crankshaft eventually has the desired unbalance masses.

Now in actual practice several difficulties arise :

Firstly in an automatic balancing machine it is difficult to keep rotating a workpiece having a considerable want-of-balance and to measure its movements.

Furthermore, it is difficult to calculate this want-of-balance from a measured value of relatively great amplitude in relation to the tolerances generally admitted, with a view to obtain a sufficient absolute precision when the relative precision is related to high values.

In fact, theoretically various methods of mechanical or electro-mechanical character permit ascertaining in the cradle of a balancing machine the dynamic action produced by the crankshaft and connecting-rod assembly; however in actual practice, these methods are either inadequate or difficult to maintain sufficient precision. During automatic operations the absolute requirement of synchronizing the rotation of the workpiece being measured with the dynamic action of the crankshaft and connecting-rod assembly constitutes the source of major errors. If the simulation of the crankshaft and connecting-rod effect is obtained mechanically by synchronization or driving directly an auxiliary shaft, the elimination of play (generating uncontrollable stray vibration) is a source of additional difficulties.

The present invention is based on the fact that all dynamic want-of-balance systems generated by the rotation of a member can be reduced to a system comprising two wants-of-balance of known amplitude and direction, lying in parallel planes perpendicular to the axis of rotation.

This invention is a device for pre-balancing the crankshafts of internal combustion engines for producing a dynamic balancing taking the consideration of the want-of-balance caused by the connecting-rod masses. This device comprises a member for simulating these wants-of-balance or unbalance masses, which is adapted to be positioned on the crankshaft and comprises a pair of resilient clamps adapted to enclose a pair of crankpins, an angular adjustment fork adapted to be disposed straddlewise on another crankpin, and longitudinal positioning faces between the crankwebs of one of said crankpins.

Under these conditions it is clear that this operation can be performed automatically and that the degree of precision thus obtained may be relatively high since the simulation member is secured to the crankshaft proper. On the other hand, the precision of the axial positioning is not cricital and positioning within several tenths of millimeter is possible without producing any appreciable want-of-balance simulation error.

A typical form of embodiment of this invention will now be described by way of example with reference to the attached drawings, in which :

FIG. 2 is a cross-section taken along the line II—II of FIG. 1, showing the means for fastening the simulation member ;

FIG. 3 is an end view of the simulation member in the waiting position in its handling structure, before the automatic positioning thereof on the crankshaft ;

FIG. 4 is a top plane view of the simulation member secured to the same crankshaft, and FIG. 5 is a cross section taken along the line V—V of FIG. 4, showing the angular indexing of the simulation member on the central crankpin.

Figure 1:
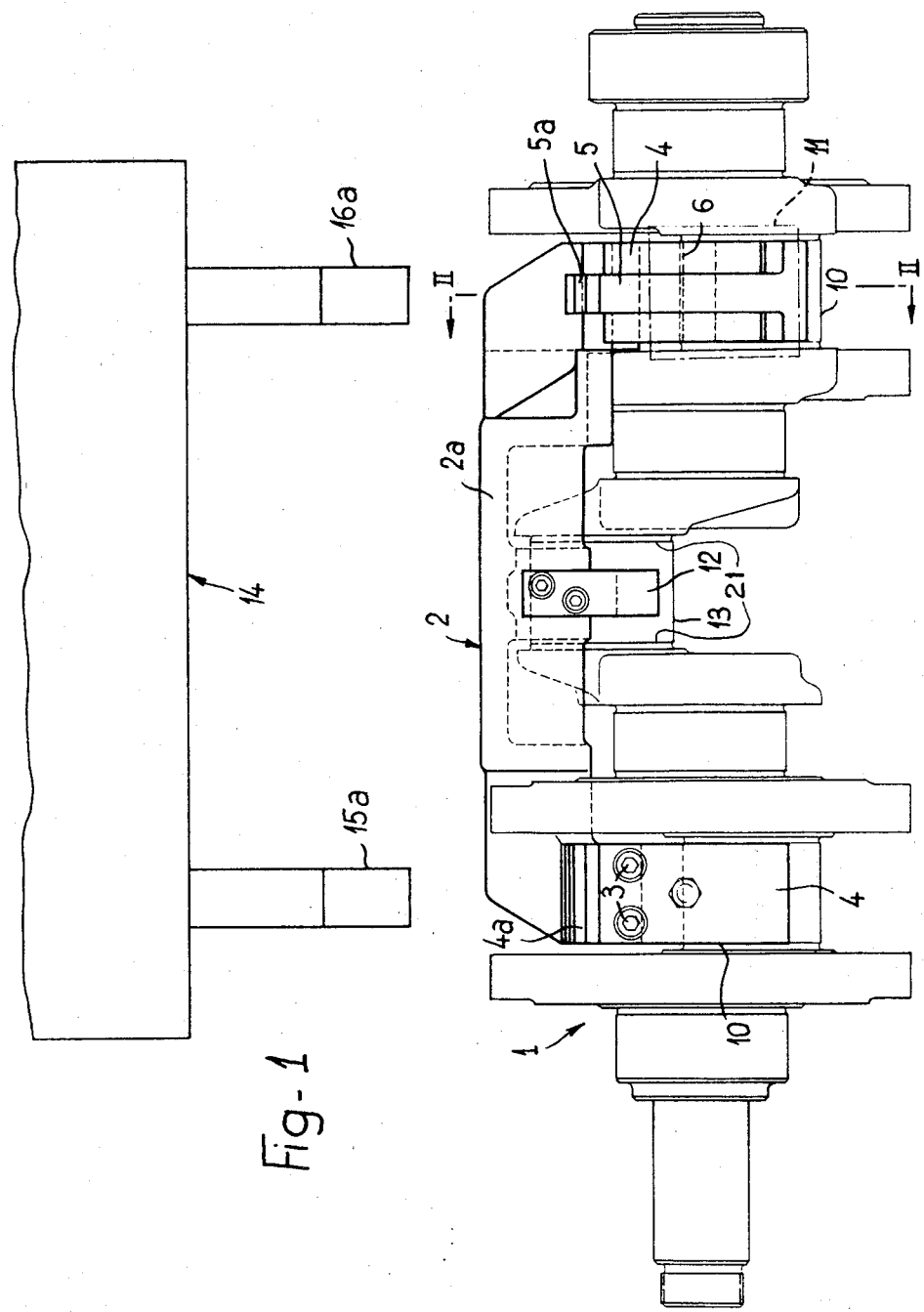
FIG. 1 is a side elevational view of a crankshaft of a V-6 engine taken by way of example, to which the connecting-rod unbalance mass simulation member has been fitted.

Referring to FIGS. 1, 2 and 4 of the drawings, the reference numeral 1 designates the crankshaft and 2 is the simulation member, which comprises a rigid beam 2a of light alloy having secured to either of its ends, by means of screws 3, an elastic clamp comprising in this case a jaw 4 connected to said beam by means of said screw, and another jaw 5 pivoted intermediate its ends to the first jaw 4 through a hinge pin 6. The elastic means incorporated in this clamp consists of stacked dished washers 7 enclosed in a recess 8 of jaw 4. The washers bearing against the bottom of recesses 8 are positioned on a guide rod 9 which is secured to jaw 5 and extends through the bottom of said recess 8.

These resilient clamps are adapted to enclose and grip a pair of crankpins 10 of crankshaft 1, in this example the pair of end crankpins, and the jaw 4 of each clamp is connected to a ballast 11 (shown in dash and dot lines in FIG. 1), these ballasts being designed for imparting to the simulation member a dynamic want-of balance identical with that of the connecting-rod assembly which will later be secured to the crankshaft.

Moreover, as shown in FIGS. 1, 4 and 5, the beam 2a has its central portion shaped as a fork having two insert prongs 12 adapted to be fitted straddlewise on the central crankpin 13 of crankshaft 1 and therefore to determine the angular position of the simulation member on the crankshaft, when the jaws 4, 5 of the clamps are caused to engage the crankpins 10.

The fork of beam 2a is also adapted to properly determine the axial position of the simulation member between the webs of the corresponding crankpin 13 by means of longitudinal positioning faces 21. These positioning faces could, of course, be on any other crankpin.

The jaws 4, 5 of said clamps each have on their outer face and at their lower portion (considering the simulation member as mounted on the crankshaft 1) a notch 4a, 5a. The function of these notches is to permit the automatic handling of the simulation member with the assistance of a handling clamp shown diagrammatically at 14 in the upper portion of FIG. 1. This clamp comprises a pair of claws 15a, 15b and 16a, 16b adapted to be actuated symmetrically for engaging said notches 4a, 5a.

Thus, when these claws are closed on said notches 4a, 5a, the handling clamp is adapted to hold alone the simulation member of which the clamp jaws 4, 5 are then open, as illustrated in FIG. 3.

Moreover, by causing a downward translational movement of said handling clamp the simulation member may be brought above the crankshaft in the position shown in FIG. 2 in which the movable jaw 4 of said clamp is shown in dash-and-dot lines in its corresponding initial position of engagement of the crankpin. By moving the claws of the handling clamp away from each other, the jaws 4, 5 of the aforesaid clamps are caused to grip the corresponding crankpins 10 to which they are centered automatically at three contact points 17, 18 and 19 between which lies the center of each crankpin whereby, in connection with the angular position resulting from the action of the central fork having said prongs 12, the simulation member is set in a predetermined position on the crankshaft, constituting a waiting position on the balancing machine (not shown). Under these conditions, the handling clamp may be retracted by effecting a vertical translational movement in a direction opposite to the preceding movement of translation to permit the balancing operation, whereafter the crankshaft is restored to its initial waiting position and said handling clamp is again used for taking the simulation member in order to discharge the crankshaft concerned and substitute another crankshaft therefor.

The simulation member assembly is so designed that its dynamic want-of-balance about the crankshaft axis is identical with that of the connecting-rod assembly, or that imposed by the crankshaft design. However, it is possible to obtain the precise adjustment of this want-of-balance without resorting to any direct machining operation, for example by using a reference crankshaft.

Such a reference crankshaft would firstly be provided with the inertia weights or masses on its crankpins, as specified by the manufacturer, and then balanced exactly according to this technique. Then the crankpin-supported masses would be removed and replaced by the simulation member. The assembly comprising said reference crankshaft and said simulation member is then balanced by correcting the ballasts 11 occupying a position calculated with a view to permit this correction.

Although a single form of embodiment of this invention has been described herein, it will be readily understood by those conversant with the art that several modifications and variations may be brought thereto without departing from the spirit and scope of the invention as set forth in the appended claims.

What I claim as new is :

1. Device for pre-balancing the unbalance masses of piston engine crankshafts for obtaining a dynamic balancing taking due account of the wants-of-balance generated by the connecting-rod masses, comprising a member for simulating said wants-of-balance, which is adapted to be positioned on said crankshaft and comprises a pair of elastic clamps adapted to engage two crankpins of said crankshaft, an angular timing fork adapted to fit straddlewise on another crankpin, and longitudinal positioning faces between the webs of one of said crankpins.

2. Pre-balancing device according to claim 1, in which said clamps comprise each two hingedly interconnected jaws urged by resilient means to their gripping position and provided with gripping notches engageable by a detachable handling clamp for releasing said jaws from their gripping position.

3. The device of claim 1 in which said member for simulating said wants-of-balance includes two angularly spaced ballasts disposed in planes parallel to each other and perpendicular to the axis of the crankshaft.

* * * * *

UNITED STATES PATENT OFFICE
CERTIFICATE OF CORRECTION

Patent No. 3,777,340          Dated December 11, 1973

Inventor(s) Christian LANGLOIS

It is certified that error appears in the above-identified patent and that said Letters Patent are hereby corrected as shown below:

In the heading of the Patent, please add the following pertinent information under Foreign Application Priority Data:

-- June 16, 1970 France ........... 70/22.143 --

Signed and sealed this 16th day of July 1974.

(SEAL)
Attest:

McCOY M. GIBSON, JR.
Attesting Officer

C. MARSHALL DANN
Commissioner of Patents